UNITED STATES PATENT OFFICE.

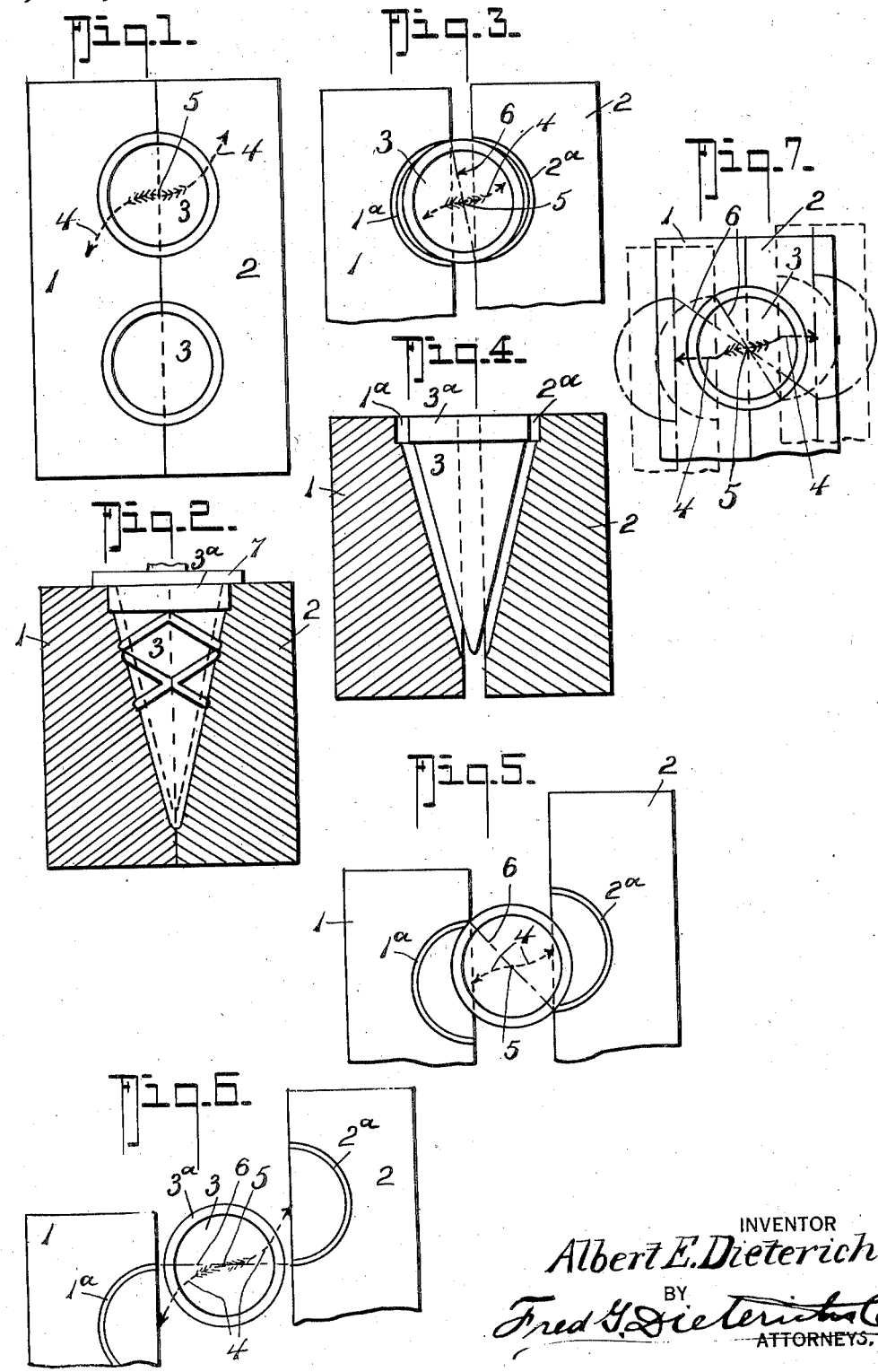

ALBERT E. DIETERICH, OF WASHINGTON, DISTRICT OF COLUMBIA.

METHOD OF EXTRACTING CONES FROM THEIR BAKING-MOLDS.

1,312,239.            Specification of Letters Patent.       Patented Aug. 5, 1919.

Application filed June 14, 1918. Serial No. 240,004.

*To all whom it may concern:*

Be it known that I, ALBERT E. DIETERICH, a citizen of the United States, residing at Washington, in the District of Columbia, have invented certain new and useful Improvements in Methods of Extracting Cones from their Baking-Molds, of which the following is a specification.

This invention has for its object to provide a new and useful method for removing cones from split molds, especially such as are used on the automatic cone making machines of the well-known Bruckman type, see Patent No. 1,071,027, granted August 26, 1913, and my present invention is diagrammatically illustrated in the accompanying drawing, in which:—

Figure 1 is a top plan view of a two-cavity mold.

Fig. 2 is a transverse section through one of the cavities.

Fig. 3 is a detail view, parts being broken away, showing the manner in which the mold sections are moved to effect the detachment of the cone, the position being with the molds only slightly separated.

Fig. 4 is a transverse section of the parts positioned as shown in Fig. 3.

Fig. 5 is a view similar to Fig. 3 with the molds opened further at the point where the cone has just about been completely detached from the mold.

Fig. 6 is a view similar to Fig. 5 with the molds entirely open and the cone dropping freely.

Fig. 7 is a top plan view, the molds being closed in full lines and opened in dotted and dot and dash lines, illustrating a slight modification of the movement of the mold.

In the drawings, 1 and 2 designate the mold sections, 3 the cone, 4 the arrows indicating the direction of movement of the respective mold sections, 5 the center or axial line of the cone and 6 designates an imaginary line drawn between the points of contact of the mold with the cone during the performance of the detaching function and indicating the line along which the mold sections maintain engagement with the cone for the purpose of imparting the necessary roll or twist to the cone to detach it from the mold.

In using my method for extracting cones from molds, the mold sections 1—2 are given a relative movement to effect a lateral separation of the same and at the same time are given a relative longitudinal movement to maintain contact between the following edge of the mouth of the mold cavity wall and the cone while permitting the leading edge to leave the cone, thus imparting a rolling motion to the cone and virtually rolling it out of the mold cavity, as it were. The amount to which the cone need be rolled out of the cavity or rather the degree to which the two mold sections 1 and 2 shall be moved longitudinally in opposite directions with relation to each other will depend upon the style of cone being made. If the cone is a smooth surface cone, that is,—without ribs or corrugations, perhaps a slight rolling movement only will be necessary to effect the disengagement (as, for instance, a separation to the dotted line position in Fig. 7) after which a purely lateral motion to the mold, see dot and dash position, Fig. 7, may be imparted thereto to separate the molds wide enough to let the cone drop down.

Where the mold is of the inverted type and the cone drops out "big end" first it will, of course, be understood that only a relatively slight lateral separation of the molds will be necessary and after the parts have moved to approximately the position shown in Fig. 5, for example, the lateral movement of the mold sections 1 and 2 may be discontinued and a reverse longitudinal movement imparted thereto to free the contacting edges of the mold cavity wall from the cone as the cone will then drop freely big end down and will not need to pass through between the mold sections.

Instead of moving both mold sections 1 and 2 one section may be held stationary and the entire movement imparted to the other section, in which event the axis of the cone will also be displaced laterally toward the moving mold section to make up for the lack of movement of the stationary mold section, as will be clear to those skilled in the art. Where both mold sections are moved, however, the axial line of the cone may be maintained in a relatively fixed place, while when one section only is used that axial line will be laterally displaced.

It may be found in practice that it will not be necessary to remove the core from the cone but that by a movement of the mold sections 1—2 the cone will not only be freed from the female mold sections but by the twisting action will also be freed from the core section, the core being indicated in Fig.

2 of the drawings by reference numeral 7. I prefer, however, to first remove the core, especially where a ribbed cone is being formed. Where the cone, however, is a smooth cone and the cores are well greased so that there may be but slight adhesion thereto, it may not be necessary to remove the core prior to the operation of the female mold sections for the performance of the releasing function, as above indicated.

Other modifications of the invention will be apparent to those skilled in the art, and while I have described the invention as especially adapted for use in extracting cones from their baking molds, it is obvious that the invention can be used in extracting other forms of cup pastry from the molds.

What I claim is:—

1. The method of releasing cones or other similar cup pastry articles from their molds which consists in moving the mold halves at once laterally and longitudinally in opposite directions while maintaining the rear or following edge of the mold cavity mouth of the respective female mold sections in contact with the article to thereby impart a rotary motion to the cone to relatively roll it out of the cavity.

2. The method of releasing the cones or other similar cup pastry articles from split molds which consists in relatively moving the one mold section laterally away from the opposite section and simultaneously moving the same longitudinally to roll the article out of the mold cavity.

3. The method of releasing stiff frangible ice cream cones or other similar cup pastry articles from split molds which consists in rolling the article out of the mold cavity, the rolling motion being imparted to the article around its longitudinal axis.

4. The method of releasing cones or other similar cup pastry articles from split molds and their cores which consists in separating the female mold parts in a manner to impart a rolling or twisting motion to the article, thus twisting the article on the core and simultaneously freeing the article from adhesion to both the female molds and the core.

5. The method of releasing cones or other similar cup pastry articles from split molds which consists in moving the mold sections simultaneously away from each other in a combined lateral and longitudinal direction for a sufficient distance to roll the article loose from the mold cavity walls and then laterally separating the female mold sections a degree sufficient to permit the article to drop out of engagement with the molds.

ALBERT E. DIETERICH.